(12) United States Patent
Li et al.

(10) Patent No.: US 11,734,648 B2
(45) Date of Patent: Aug. 22, 2023

(54) SYSTEMS AND METHODS RELATING TO EMOTION-BASED ACTION RECOMMENDATIONS

(71) Applicant: Genesys Telecommunications Laboratories, Inc., Daly City, CA (US)

(72) Inventors: Jessica Li, Markham (CA); Leor Grebler, Markham (CA); Ankit Pat, Markham (CA); William Zhao, Markham (CA)

(*) Notice: Subject to any disclaimer, the term of this patent is extended or adjusted under 35 U.S.C. 154(b) by 245 days.

(21) Appl. No.: 16/890,508

(22) Filed: Jun. 2, 2020

(65) Prior Publication Data

US 2021/0374671 A1 Dec. 2, 2021

(51) Int. Cl.

| G10L 15/26 | (2006.01) |
|---|---|
| G06Q 10/10 | (2023.01) |
| G06N 3/08 | (2023.01) |
| G06F 40/295 | (2020.01) |
| G06F 18/2113 | (2023.01) |

(52) U.S. Cl.
CPC ......... G06Q 10/10 (2013.01); G06F 18/2113 (2023.01); G06F 40/295 (2020.01); G06N 3/08 (2013.01); G10L 15/26 (2013.01)

(58) Field of Classification Search
CPC .......... G06Q 10/10; G06K 9/623; G06N 3/08; G06N 3/0445
See application file for complete search history.

(56) References Cited

U.S. PATENT DOCUMENTS

| 6,598,020 B1* | 7/2003 | Kleindienst | G10L 13/08 |
| | | | 704/270.1 |
| 7,684,984 B2* | 3/2010 | Kemp | G10L 15/065 |
| | | | 704/235 |
| 7,739,115 B1* | 6/2010 | Pettay | G10L 25/51 |
| | | | 379/265.06 |
| 10,397,404 B1* | 8/2019 | Amir | G06T 1/20 |
| 10,630,840 B1* | 4/2020 | Karp | H04M 3/5235 |
| 10,805,465 B1* | 10/2020 | Krebs | G06F 40/279 |
| 2005/0114142 A1* | 5/2005 | Asukai | H04M 1/72427 |
| | | | 704/270 |
| 2011/0010173 A1* | 1/2011 | Scott | G10L 15/26 |
| | | | 704/235 |
| 2013/0132088 A1* | 5/2013 | Kim | A61B 5/165 |
| | | | 704/270 |
| 2014/0163960 A1* | 6/2014 | Dimitriadis | G10L 17/26 |
| | | | 704/9 |
| 2014/0220526 A1* | 8/2014 | Sylves | G06Q 10/06395 |
| | | | 434/238 |

* cited by examiner

Primary Examiner — Jesse S Pullias

(57) ABSTRACT

A system and method are presented relating to emotion-based action recommendations. The present invention may include a recommender engine that analyzes several pieces of information and using artificial intelligence derived models, provides a course of action for a contact center agent and the probability and estimations behind the recommendation as a justification. System inputs include cost of the item or service being troubleshooted, estimated costs for different resolutions, cost of each escalation level of the interaction, history of previous interactions, agent costs, history of the current interaction, acoustic events and sentiment or primary detected emotions of the customer's transcript. The recommended course of action, rationale, and authorization can be provided as output. The system may record whether the agent followed the recommendation to improve further recommendations.

17 Claims, 3 Drawing Sheets

SYSTEMS AND METHODS RELATING TO EMOTION-BASED ACTION RECOMMENDATIONS

BACKGROUND

The present invention generally relates to telecommunications systems in the field of customer relations management including customer assistance via internet-based service options. More particularly, but not by way of limitation, the present invention pertains to systems and methods for expediting the customer experience using emotion detection and early resolution recommendations.

BRIEF DESCRIPTION OF THE INVENTION

A system and method are presented relating to emotion-based action recommendations. The present invention may include a recommender engine that analyzes several pieces of information and using artificial intelligence derived models, provides a course of action for a contact center agent and the probability and estimations behind the recommendation as a justification. System inputs include cost of the item or service being troubleshooted, estimated costs for different resolutions, cost of each escalation level of the interaction, history of previous interactions, agent costs, history of the current interaction, acoustic events and sentiment or primary detected emotions of the customer's transcript. The recommended course of action, rationale, and authorization can be provided as output. The system may record whether the agent followed the recommendation to improve further recommendations.

In an embodiment, a method is presented for automatically providing recommendations to an agent in a contact center environment, the method comprising the steps of: receiving a voice interaction in the contact center from a first party about an issue; retrieving information from a record associated with the first party, wherein the information comprises at least one of: previous orders, total value of the orders, cost of goods sold, cost to return an item, interaction history of the customer with the contact center, end-call codes from each interaction in the history of the customer, sentiment analysis of historical interaction transcripts, and manually input information from an agent of the contact center; transcribing speech of the voice interaction in real-time through a speech recognition service; analyzing the transcription for named entity recognition, topic identification, and sentiment analysis for each utterance of the caller to automatically determine the issue behind the interaction and determining a primary emotion among a plurality of emotions of the first party from the transcription; determining a path to resolve the issue through a plurality of means, considering a specified business priority, wherein those means comprise at least one of: troubleshooting, refund, return, and reimbursement; and returning a suggested course of action to the agent that maximizes the business priority.

The method further comprises the step of recording data on whether the course of action followed by the agent followed the suggested course of action and inputting the data into the system as a feedback loop for improving future suggested courses of action.

The specified business priority comprises a net promoter score. The suggested course of action comprises a rationale for the suggestion and an authorization for the agent to conduct said course of action.

The determining comprises an algorithm formulated based on sequence classification from contact center historical data. The contact center historical data further comprises: product loss, labor cost, cost of escalations, cost of public relations, interaction cost, and potential loss of future sales. The algorithm comprises a neural network with LSTM units and wherein inputs to the algorithm comprise at least one of: sentiment analysis of the transcription, call tracking flags, mood analytics, speech analytics, image-based motion detection, and end-call codes.

In another embodiment, a method is presented for automatically providing recommendations to an agent in a contact center environment, the method comprising the steps of: receiving a chat interaction in the contact center from a first party about an issue; retrieving information from a record associated with the first party, wherein the information comprises at least one of: previous orders, total value of the orders, cost of goods sold, cost to return an item, interaction history of the customer with the contact center, end-interaction codes from each interaction in the history of the customer, sentiment analysis of historical interaction transcripts, and manually input information from an agent of the contact center; analyzing the chat interaction for named entity recognition, topic identification, and sentiment analysis for each utterance of the first party to automatically determine the issue behind the interaction and determining a primary emotion among a plurality of emotions of the first party from the interaction; determining a path to resolve the issue through a plurality of means, considering a specified business priority, wherein those means comprise at least one of: troubleshooting, refund, return, and reimbursement; and returning a suggested course of action to the agent that maximizes the business priority.

In yet another embodiment, a system is presented for automatically providing recommendations to an agent in a contact center environment, the system comprising: a processor; and a memory in communication with the processor, the memory storing instructions that, when executed by the processor causes the processor to return a suggested course of action by: receiving a voice interaction in the contact center from a first party about an issue; retrieving information from a record associated with the first party, wherein the information comprises at least one of: previous orders, total value of the orders, cost of goods sold, cost to return an item, interaction history of the customer with the contact center, end-call codes from each interaction in the history of the customer, sentiment analysis of historical interaction transcripts, and manually input information from an agent of the contact center; transcribing speech of the voice interaction in real-time through a speech recognition service; analyzing the transcription for named entity recognition, topic identification, and sentiment analysis for each utterance of the caller to automatically determine the issue behind the interaction and determining a primary emotion among a plurality of emotions of the first party from the transcription; determining a path to resolve the issue through a plurality of means, considering a specified business priority, wherein those means comprise at least one of: troubleshooting, refund, return, and reimbursement; and returning a suggested course of action to the agent that maximizes the business priority.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Figure 1:
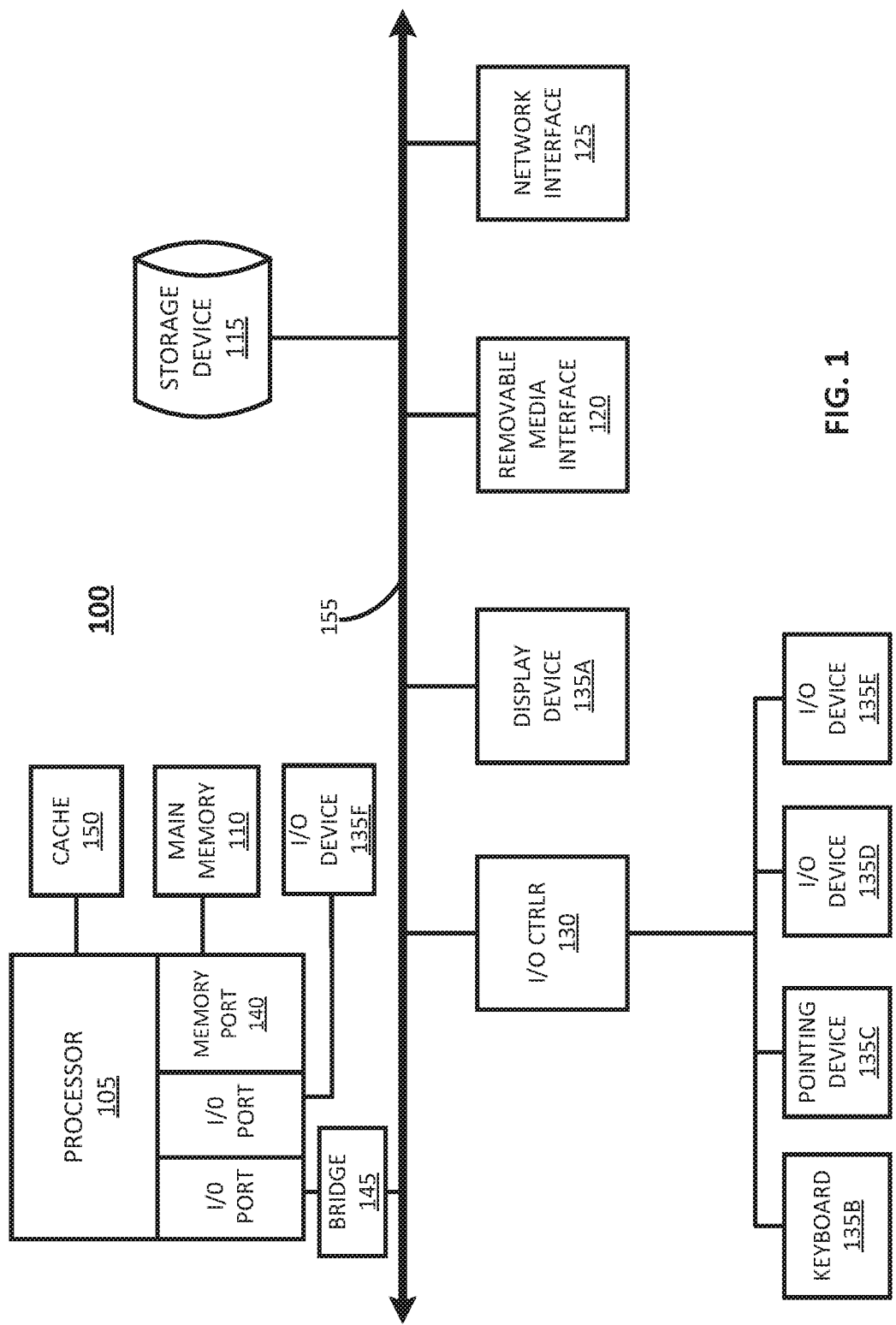
FIG. 1 is a diagram illustrating an embodiment of a block diagram of an exemplary computing device.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Embodiments of the present invention may be implemented as an apparatus, method, or computer program product. Accordingly, example embodiments may take the form of an entirely hardware embodiment, an entirely software embodiment (including firmware, resident software, micro-code, etc.), or an embodiment combining software and hardware aspects. In each case, the example embodiment may be generally referred to as a "module" or "system" or "method". Further, example embodiments may take the form of a computer program product embodied in any tangible medium of expression having computer-usable program code embodied in the medium.

It will be further appreciated that the flowchart and block diagrams provided in the figures illustrate architecture, functionality, and operation of possible implementations of systems, methods, and computer program products according to example embodiments of the present invention. In this regard, each block in the flowchart or block diagrams may represent a module, segment, or portion of code, which comprises one or more executable instructions for implementing the specified logical functions. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Agents in contact centers may waste a significant amount of time trying to troubleshoot customer issues when the problem ultimately is only resolvable through a refund, reimbursement, or return to a customer. Customers and agents can become frustrated with the process, whether it's the customer with the agent or the company policy, or the agent with the customer and having to enforce the company policy. Customer emotions can be used as a feature for computing next best action strategies through predicting outcomes early in an interaction, such as whether the interaction will ultimately lead to a refund/reimbursement/return scenario, and alerting the agent of a recommendation, such as deciding early on whether to quickly refund the customer or offer a return. Company policies around refund/reimbursement/return trend towards rigidity (e.g., no refunds allowed) or looseness (e.g., do anything that makes the customer happy for under $500). More autonomy in enforcing policy may lead to happier customers and agents, but it is harder to track the circumstances where such a policy is effective.

Turning now to FIG. 1, a schematic block diagram of an exemplary computing device 100 is shown in accordance with embodiments of the present invention and/or with which exemplary embodiments of the present invention may be enabled or practiced. Those skilled in the art will recognize that the various systems and methods disclosed herein may be computer implemented using many different forms of data processing equipment, for example, digital microprocessors and associated memory executing appropriate software programs. It should therefore be appreciated that FIG. 1 is provided as a non-limiting example.

The computing device 100 may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. For example, the various servers may be a process or thread running on one or more processors of one or more computing devices 100, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the contact center system 200 of FIG. 2—the various servers and computer devices thereof may be located on local computing devices 100 (i.e., on-site at the same physical location as the agents of the contact center), remote computing devices 100 (i.e., off-site or in a cloud-based or cloud computing environment, for example, in a remote data center connected via a network), or some combination thereof. In exemplary embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, or the like.

As shown in the illustrated example, the computing device 100 may include a central processing unit (CPU) or processor 105 and a main memory 110. The computing device 100 may also include a storage device 115, removable media interface 120, network interface 125, and one or more input/output (I/O) devices 135, which as depicted may include an I/O controller 130, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The cache memory 150 typically has a faster response time than main memory 110. The main memory 110 may be one or more memory chips capable of storing data and allowing stored data to be directly accessed by the central processing unit 105. The storage device 115 may provide storage for an operating system and software that run on the computing device 100. The operating system may control scheduling tasks and access to system resources. Unless otherwise limited, the operating system and software may include any capable of performing the operations described herein, as would be appreciated by one of ordinary skill in the art.

As shown in the illustrated example, the computing device 100A may include a wide variety of I/O devices 135. As shown, a I/O controller 130 may be used to control one or more I/O devices. As shown, Input devices may include the keyboard 135B and pointing device 135C, which, for example, may be a mouse or optical pen. Output devices, for example, may include video display devices, speakers and printers. The I/O devices 135 and/or the I/O controller 130 may include suitable hardware and/or software for enabling for the use of multiple display devices. The computing device 100 may also support one or more removable media interfaces 120, such as a disk drive, USB port, or any other device suitable for reading data from or writing data to any type of computer readable media. The removable media interface 120, for example, may be used for installing software and programs.

The computing device 100 may be any workstation, desktop computer, laptop or notebook computer, server machine, virtual device, mobile telephone, smart phone, portable telecommunication device, media playing device, gaming system, mobile computing device, or any other type of computing, telecommunications or media device, without limitation, capable of performing the operations described herein. The computing device 100 may have several input devices with each having different processors and operating systems. The computing device 100 may include a mobile device that combines several devices, such as a mobile phone having a digital audio player or portable media player.

The computing device 100 may be one of a plurality of devices connected by a network or connect to other systems and resources via a network. As used herein, a network includes one or more computing devices, machines, clients, client nodes, client machines, client computers, client devices, endpoints, or endpoint nodes in communication with one or more other computing devices, machines, clients, client nodes, client machines, client computers, client devices, endpoints, or endpoint nodes. As an example, a local machine may have the capacity to function as both a client node seeking access to resources provided by a server and as a server providing access to hosted resources for other clients.

The network may be LAN or WAN links, broadband connections, wireless connections, or some combination thereof, with connections being established using appropriate communication protocols. The computing device 100 may communicate with other computing devices 100 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization are also contemplated, such as, for example, the network (e.g., via software defined networking) or functions (e.g., via network functions virtualization).

Figure 2:
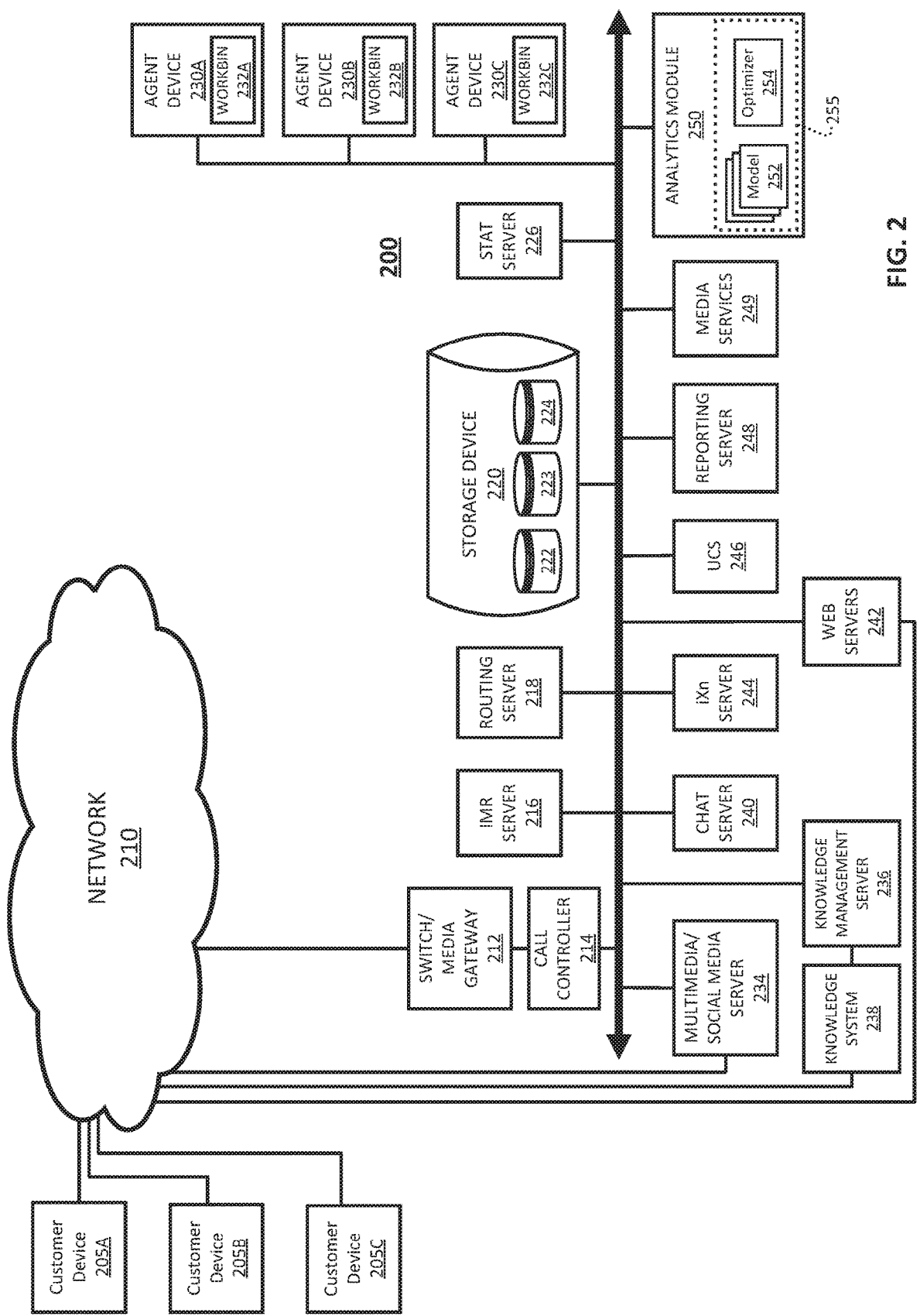
FIG. 2 is a diagram illustrating an embodiment of a contact center system.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and the like. In many cases this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

Referring specifically to FIG. 2, the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction (or "iXn") server 244; universal contact server (or "UCS") 246; reporting server 248; media services server 249; and analytics module 250. It should be understood that any of the computer-implemented components, modules, or servers described in relation to FIG. 2 or in any of the following figures may be implemented via types of computing devices, such as, for example, the computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment (e.g. Genesys (ID Designer).

In regard to the routing server 218, it may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

Regarding data storage, the contact center system 200 may include one or more mass storage devices—represented generally by the storage device 220—for storing data in one or more databases relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices—i.e., agent devices 230A, 230B and 230C—it should be understood that any number may be present.

In regard to the multimedia/social media server 234, it may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson or a like system.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction (iXn) server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment.

Figure 3:
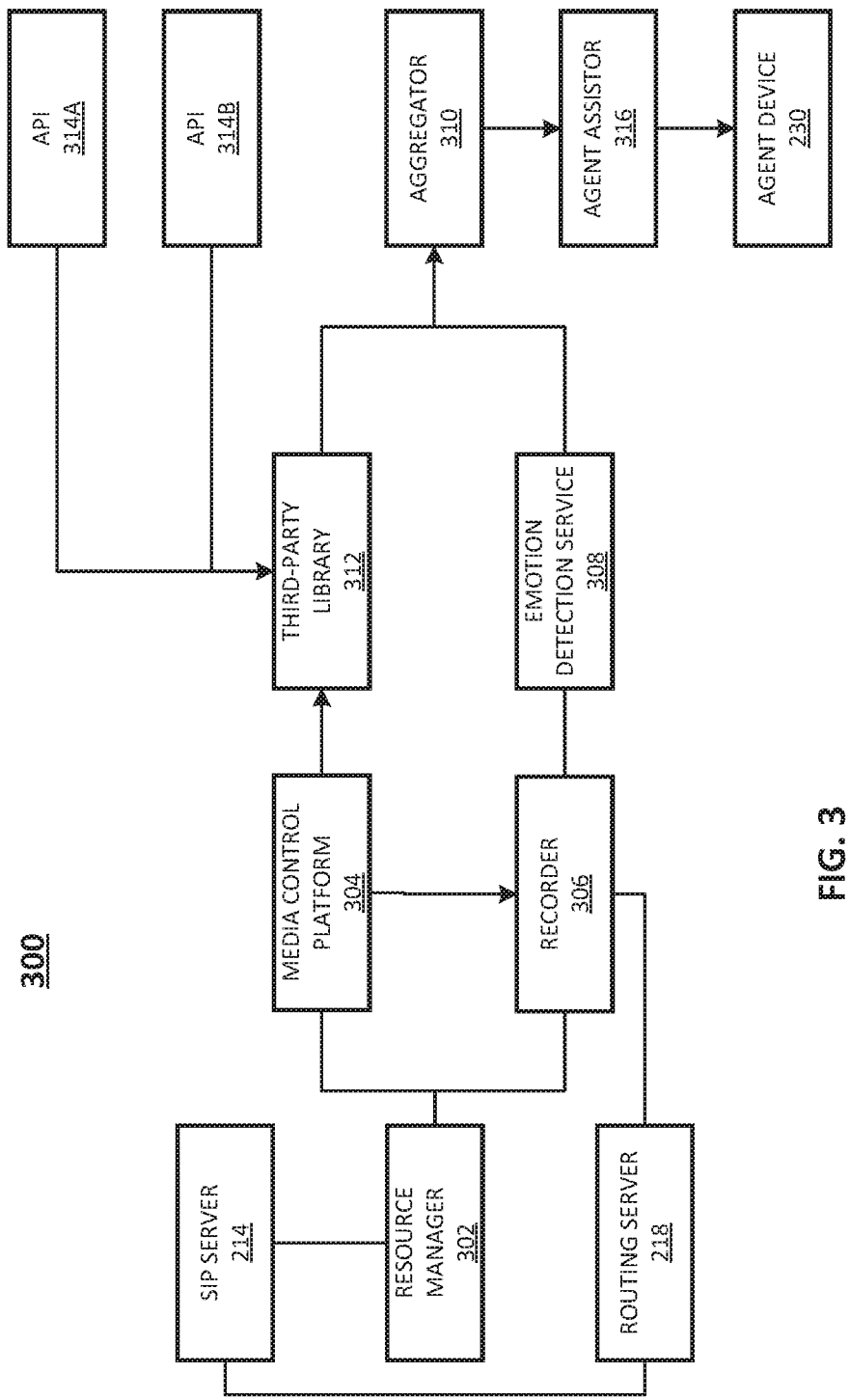
FIG. 3 is a diagram illustrating an embodiment of a system for emotion-based action detection.

FIG. 3 is a diagram illustrating an embodiment of a system for emotion-based action detection, indicated generally at 300. The system 300 includes a SIP Server 214 in communication with a resource manager 302 and a routing server 218. The SIP Server 214 functions as part of the call controller 214 (FIG. 2). The SIP Server provides an interface between the telephony hardware and the software components. In an embodiment, the SIP server is a TCP/IP-based server that can also act as a messaging interface between SIP Server clients.

The resource manager 302 controls access and routing to the resources, particularly those of a voice platform installed in the contact center system 200. It processes requests for services and interacts with a configuration server to determine an IVR profile to be associated with the session in addition to VoiceXML, CCXML, announcements, and conference application, resource and service profiles required to deliver the service. The resource manager 302 allocates and monitors SIP resources to maintain a current status of the resources and provides load balancing and high availability for each resource type, as the workload is evenly distributed among resources of the same type. The resource manager 302 pushes the profile to a component that can deliver the service, such as the media control platform 304. The media control platform 304 executes the actual voice applications and is used by other communication layer components, such as the SIP Server 214 to provide media services in support of broader customer service, such as agent interactions, queuing, etc. The media control platform 304 handles inbound service requests for call or media services. It receives a SIP INVITE from the resource manager 302. The platform 304 provides media services through the media server 234, for operations such as playing prompts and recording audio and video.

As previously described, the routing server 218 may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer. The routing server 218 may be in communication, using a T-Lib protocol, with the SIP Server 214 and the Recorder 306.

The recorder 306 provides recording control within the system 300. From the media control platform 304, the recorder 306 receives captured audio. Additional events and information may be received from the SIP Server 214 for voice interactions and from the iXn server 244 for non-voice interactions (chats, emails, etc.). The recorder 306 records both audio and desktop screen activity of the interaction between agent and customer and stores this information. The emotion detection service 308 (a non-limiting example being Beyond Verbal Emotions Analytics API) analyzes the emotions from the recordings collected by the recorder 306. This information is provided to an aggregator 310 which also receives information from a third-party library 312.

The third-party library 312 may comprise, in an embodiment, UniMRCP, which is an open-source implementation of the media resource control protocol (MRCP) which is used by the MCP 304 to provide information to the third-party library 312. The third-party library 312 utilizes APIs 314A, 314B for speech-to-text and NLU. While only two are illustrated for simplicity purposes, any number of APIs may be employed. These APIs are used to transcribe the speech of the caller while speaking to the agent in real-time. In an embodiment, transcription may not be necessary as in the case of a chat interaction between a customer and an agent or an interaction between a customer and a chatbot. The transcription has named entity recognition performed on it, topic identification, and analysis of the sentiment (valence and intensity) of each utterance of the caller.

Emotions are measured and recorded on a dimensional scale by the emotion detection service 308, where each dimension represents an emotion. In an embodiment, a six-dimensional scale may be used. Any given interaction is broken down into a step-wise series of moves with the six-dimensional reading attached. Each time the customer or the agent says something during the interaction, this speech (or chat, in the case of a chat interaction) may be classified as a move/action by that party. Each action then has an intent associated with it (such as how intents are classified through chat bots in standard processes in the art). Any given interaction can be transformed into a series of data points associated with emotion and/or intent. The circumstances of the interaction are analyzed, the customers disposition and receptivity to courses of resolution, and other information related to the costs of resolving the interaction are aggregated through an aggregator 310 and used to form a recommendation to the agent based on a predetermined business priority (e.g., increasing net promoter score, reducing average handling time, or increasing the rate of first call resolution). For historical data, the series of data points are observed and tagged for each call with the eventual outcome from the disposition code. In order to make predictions, the sequence of emotions/intents are monitored for a live call and a machine-learning classification algorithm utilized by the aggregator 310 is applied to predict the outcome of the interaction, which may be used to quickly resolve the customer's issue(s). In an embodiment, notes input from the agent may also be used to assist in identifying the issue.

In one example, as a customer calls into a contact center, the following information is automatically retrieved from a sales record: previous sales orders, total value of sales made to the individual, the cost of the goods sold, the cost to the company to have the item returned, and the customer's previous call history. The customer's previous call history may include the number of contact attempts, the disposition/ wrap-up (or end-call or end-interaction) code from each call, and the sentiment analysis of previous transcripts if maintained. If there is no history, the agent may manually input information, such as an order number or product information. In an embodiment, the system may also determine the estimated number of transfers and total call time to resolve the issue through troubleshooting. Estimates may be determined for costs to provide a refund, the cost to process a return, and different reimbursement courses of action.

If the company has specified that it prioritizes maintaining or increasing net promoter scores and assigns a value to maintaining this, the system will estimate the impact of the different resolution paths based on statistical analysis of wrap up codes for similar issues and the number of terms and total call time. The course of action may be suggested that maximizes the outcome, including refunding the customer. An analysis may be performed for each specified priority by the company.

The recommendation of the system will appear to the agent as a popup in the agent's console. The recommendation will be facilitated through an artificial intelligence assistant to the agent 316 that provides real-time knowledge suggestions (e.g., FAQs, knowledge articles, recommended content, etc.) based on the context of the live conversation between the parties to the interaction (agent and customer, or chatbot and customer). The system 300 may also record whether the agent followed the recommendation or not, in addition to any positive or negative feedback on the suggestion the agent supplied (e.g., relevant or not helpful, such as through an upvote or downvote next to the suggestion), to inform the system and improve the algorithm. This comprises feedback which is looped into the system to improve recommendations in the future. The contact center manager might be able to see how many requests for refunds or returns have come in over a period of time and how many times the artificial intelligence agent has intercepted to automatically process the refund. To the customer, the screen may be shown for processing the return/refund. On the agent dashboard in the agent desktop 230, the agent might be alerted to offer up a refund much earlier in the conversation when they accept the interaction.

The algorithm can be formulated based on sequence classification. The system learns how to classify each sequence from historical data (e.g., loss of the product, cost of labor to reprocess the returned item, cost of escalations to a manager, cost of a potential PR disaster, cost of the current call, potential loss of future sales based on the customer's profile, etc.) and then, looking at a new sequence, can predict classification. Recurrent neural networks may be used, preferably with LSTM units, as the tuning is more robust to vanishing gradients. Thus, the algorithm would look like: Input->LSTM RNN layer(s)->Softmax, in order to obtain probabilities (as this is a multi-class problem). Inputs to the neural network might comprise: sentiment analysis of chatbot text, call tracking flags, mood and speech analytics by voice (speed, other emotion detection), potential for image-based emotion detection, and end-call codes, to name a few non-limiting examples. LSTMs allow for arbitrary size sequences, and while training, can be fixed to some length to make a prediction only at the end. Predictions can be made at every step of the interaction.

An LSTM layer only has 4*N weights compared to a fully connected layer (which would have N), and its output only depends on the state and the current input. The state is assumed to have been computed already, or may be equal to zero for the first time step. LSTM-RNNs are preferred to HMMs as a stateful model is needed for accurate sequence classification (e.g., the relationship between data at different time steps is important information for the classification). The output is a recommended course of action and a reason why such an action was recommended. The recommended course of action could comprise a full refund, authorization to return an item, or authorization to reimburse the customer. The reasoning could be that alternative resolutions would cost more, or reduce NPS, etc. This information may be displayed to the agent through a console that the agent uses to record information on the customer call.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

The invention claimed is:

1. A method for automatically providing recommendations to an agent in a contact center environment, the method comprising the steps of:
    receiving a voice interaction in the contact center from a first party about an issue;
    retrieving information from a record associated with the first party, wherein the information comprises at least one of:
        previous orders,
        total value of the orders,
        cost of goods sold,
        cost to return an item,
        interaction history of the first party with the contact center,
        end-call codes from each interaction in the history of the first party,
        sentiment analysis of historical interaction transcripts, and
        manually input information from an agent of the contact center;
    generating a transcription of the voice interaction in real-time through a speech recognition service;
    analyzing the transcription for named entity recognition, topic identification, and sentiment analysis for each utterance of the first party to automatically determine the issue behind the interaction and determining a primary emotion among a plurality of emotions of the first party from the transcription by classifying the sentiment analysis using a neural network with LSTM units;
    matching an action to the emotion of the first party where each action is associated with an intent, and the interaction is represented by a series of data points associated with intent of the interaction;

predicting customer disposition and reception to a course of resolution using the series of data points associated with the intent to resolve the issue through a plurality of means, considering a specified business priority comprising one of reducing average handling time or increasing a rate of first call resolution, wherein those means comprise at least one of:
troubleshooting,
refund,
return, and
reimbursement; and
returning a suggested course of action to the agent that maximizes the business priority.

2. The method of claim 1, wherein the method further comprises the step of recording data on whether a course of action followed by the agent followed the suggested course of action and inputting the recorded data into the system as a feedback loop for improving future suggested courses of action.

3. The method of claim 1, wherein the determining comprises using an algorithm formulated based on sequence classification from contact center historical data.

4. The method of claim 3, wherein the contact center historical data further comprises: product loss, labor cost, cost of escalations, cost of public relations, interaction cost, and potential loss of future sales.

5. The method of claim 1, wherein inputs to the neural network comprise at least one of: sentiment analysis of the transcription, call tracking flags, mood analytics, speech analytics, image-based motion detection, and end-call codes.

6. The method of claim 1, wherein the suggested course of action comprises a rationale for the suggestion and an authorization for the agent to conduct said course of action.

7. A method for automatically providing recommendations to an agent in a contact center environment, the method comprising the steps of:
receiving a chat interaction in the contact center from a first party about an issue;
retrieving information from a record associated with the first party, wherein the information comprises at least one of:
previous orders,
total value of the orders,
cost of goods sold,
cost to return an item,
interaction history of the first party with the contact center,
end-call codes from each interaction in the history of the first party,
sentiment analysis of historical interaction transcripts, and
manually input information from an agent of the contact center;
analyzing the chat interaction for named entity recognition, topic identification, and sentiment analysis for each chat interaction of the first party to automatically determine the issue behind the interaction and determining a primary emotion among a plurality of emotions of the first party from the interaction by classifying the sentiment analysis using a neural network with LSTM units;
matching an action to the emotion of the first party where each action is associated with an intent, and the interaction is represented by a series of data points associated with intent of the interaction;
predicting customer disposition and reception to a course of resolution using the series of data points associated with the intent to resolve the issue through a plurality of means, considering a specified business priority comprising one of reducing average handling time or increasing a rate of first call resolution, wherein those means comprise at least one of:
troubleshooting,
refund,
return, and
reimbursement; and
returning a suggested course of action to the agent that maximizes the business priority.

8. The method of claim 7, wherein the method further comprises the step of recording data on whether a course of action followed by the agent followed the suggested course of action and inputting the recorded data into the system as a feedback loop for improving future suggested courses of action.

9. The method of claim 7, wherein the determining comprises using an algorithm formulated based on sequence classification from contact center historical data.

10. The method of claim 9, wherein the contact center historical data further comprises: product loss, labor cost, cost of escalations, cost of public relations, interaction cost, and potential loss of future sales.

11. The method of claim 7, wherein inputs to the neural network comprise at least one of: sentiment analysis of the interaction, tracking flags, mood analytics, chat analytics, image-based motion detection, and end-interaction codes.

12. The method of claim 7, wherein the suggested course of action comprises a rationale for the suggestion and an authorization for the agent to conduct said course of action.

13. A system for automatically providing recommendations to an agent in a contact center environment, the system comprising:
a processor; and
a memory in communication with the processor, the memory storing instructions that, when executed by the processor causes the processor to return a suggested course of action by:
receiving a voice interaction in the contact center from a first party about an issue;
retrieving information from a record associated with the first party, wherein the information comprises at least one of:
previous orders,
total value of the orders,
cost of goods sold,
cost to return an item,
interaction history of the first party with the contact center,
end-call codes from each interaction in the history of the first party,
sentiment analysis of historical interaction transcripts, and
manually input information from an agent of the contact center;
generating a transcription of the voice interaction in real-time through a speech recognition service;
analyzing the transcription for named entity recognition, topic identification, and sentiment analysis for each utterance of the first party to automatically determine the issue behind the interaction and determining a primary emotion among a plurality of emotions of the first party from the transcription by classifying the sentiment analysis using a neural network with LSTM units;

matching an action to the emotion of the first party where each action is associated with an intent, and the interaction is represented by a series of data points associated with intent of the interaction;

predicting customer disposition and reception to a course of resolution using the series of data points associated with the intent to resolve the issue through a plurality of means, considering a specified business priority comprising one of reducing average handling time or increasing a rate of first call resolution, wherein those means comprise at least one of:

troubleshooting,
refund,
return, and
reimbursement; and returning a suggested course of action to the agent that maximizes the business priority.

14. The system of claim 13, wherein the memory in communication with the processor further causes the processor to return a suggested course of action by recording data on whether a course of action followed by the agent followed the suggested course of action and inputting the recorded data into the system as a feedback loop for improving future suggested courses of action.

15. The system of claim 13, wherein the determining comprises using an algorithm formulated based on sequence classification from contact center historical data, and wherein the contact center historical data further comprises at least one of: product loss, labor cost, cost of escalations, cost of public relations, interaction cost, and potential loss of future sales.

16. The system of claim 13, wherein inputs to the neural network comprise at least one of: sentiment analysis of the transcription, call tracking flags, mood analytics, speech analytics, image-based motion detection, and end-call codes.

17. The system of claim 13, wherein the suggested course of action comprises a rationale for the suggestion and an authorization for the agent to conduct said course of action.

* * * * *